(12) United States Patent
Huston et al.

(10) Patent No.: US 11,035,459 B2
(45) Date of Patent: Jun. 15, 2021

(54) ROLLER COOLING ARRANGEMENT FOR TOROIDAL CVT

(71) Applicant: Transmission CVTCORP Inc., Sainte-Julie (CA)

(72) Inventors: Kenneth Huston, Montréal (CA); Mathieu Guertin, Mont-Saint-Hilaire (CA); François Messier, Varennes (CA); Rémi Tremblay, Sainte-Julie (CA)

(73) Assignee: TRANSMISSION CVTCORP INC.

( * ) Notice: Subject to any disclaimer, the term of this patent is extended or adjusted under 35 U.S.C. 154(b) by 347 days.

(21) Appl. No.: 15/779,109

(22) PCT Filed: Dec. 8, 2016

(86) PCT No.: PCT/CA2016/051441
§ 371 (c)(1),
(2) Date: May 25, 2018

(87) PCT Pub. No.: WO2017/096480
PCT Pub. Date: Jun. 15, 2017

(65) Prior Publication Data
US 2018/0347685 A1    Dec. 6, 2018

Related U.S. Application Data

(60) Provisional application No. 62/265,501, filed on Dec. 10, 2015.

(51) Int. Cl.
*F16H 15/38* (2006.01)
*F16H 57/04* (2010.01)

(52) U.S. Cl.
CPC .......... *F16H 57/049* (2013.01); *F16H 15/38* (2013.01); *F16H 57/0413* (2013.01); *F16H 57/0421* (2013.01); *F16H 57/0456* (2013.01); *F16H 2015/383* (2013.01)

(58) Field of Classification Search
CPC .... F16H 57/049; F16H 15/38; F16H 57/0413; F16H 57/0456
See application file for complete search history.

(56) References Cited

U.S. PATENT DOCUMENTS

| | | | |
|---|---|---|---|
| 2,132,751 | A | 10/1938 | Murden |
| 2,910,143 | A | 10/1959 | Almen |

(Continued)

FOREIGN PATENT DOCUMENTS

| | | |
|---|---|---|
| CN | 1215462 | 4/1999 |
| CN | 1620567 | 5/2001 |

(Continued)

OTHER PUBLICATIONS

PCT International Search Report of International Searching Authority for International Patent Application No. PCT/CA2016/051441, dated Feb. 22, 2017, 5 pages.

(Continued)

*Primary Examiner* — David M Fenstermacher
(74) *Attorney, Agent, or Firm* — K&L Gates LLP

(57) ABSTRACT

A cooling arrangement to cool the rollers of a toroidal CVT is described herein. The cooling arrangement includes nozzles so configured and sized as to project cooling fluid onto the edge and onto the opposite top and bottom surfaces of the roller.

14 Claims, 5 Drawing Sheets

(56) References Cited

U.S. PATENT DOCUMENTS

| | | | | |
|---|---|---|---|---|
| 5,971,885 | A * | 10/1999 | Greenwood | ........ F16H 57/0456 |
| | | | | 476/8 |
| 6,500,088 | B2 | 12/2002 | Sugihara | |
| 6,524,213 | B2 * | 2/2003 | Mori | ........................ F16H 15/38 |
| | | | | 476/40 |
| 7,211,024 | B2 | 5/2007 | Taketsuna et al. | |
| 7,476,175 | B2 * | 1/2009 | Elser | ........................ F16H 15/38 |
| | | | | 476/40 |
| 7,491,149 | B2 * | 2/2009 | Greenwood | ............. F16H 15/38 |
| | | | | 184/13.1 |
| 9,822,870 | B2 * | 11/2017 | Foster | ................. F16H 57/0424 |
| 10,415,690 | B2 * | 9/2019 | Tanaka | .................. F16H 57/049 |
| 2002/0039948 | A1 * | 4/2002 | Ooyama | ................. F16H 57/04 |
| | | | | 476/40 |
| 2003/0190994 | A1 * | 10/2003 | Ishikawa | ............... F16H 57/043 |
| | | | | 476/46 |
| 2004/0043860 | A1 | 3/2004 | Taketsuna et al. | |
| 2014/0311831 | A1 | 10/2014 | Huston et al. | |

FOREIGN PATENT DOCUMENTS

| | | |
|---|---|---|
| EP | 1 353 091 | 1/2002 |
| EP | 1403554 | 3/2004 |
| JP | 2001-254795 | 9/2001 |
| JP | 2002-213558 | 7/2002 |
| JP | 2004-052929 A | 2/2004 |
| JP | 2004-232677 A | 8/2004 |
| JP | 2004-278740 | 10/2004 |
| JP | 2009-275745 | 11/2009 |

OTHER PUBLICATIONS

PCT Written Opinion of International Searching Authority for International Patent Application No. PCT/CA2016/051441 dated Feb. 22, 2017, 5 pages.

Japanese Office action for Japanese Application No. 2016800703413, dated Nov. 3, 2020 (11 pages).

* cited by examiner

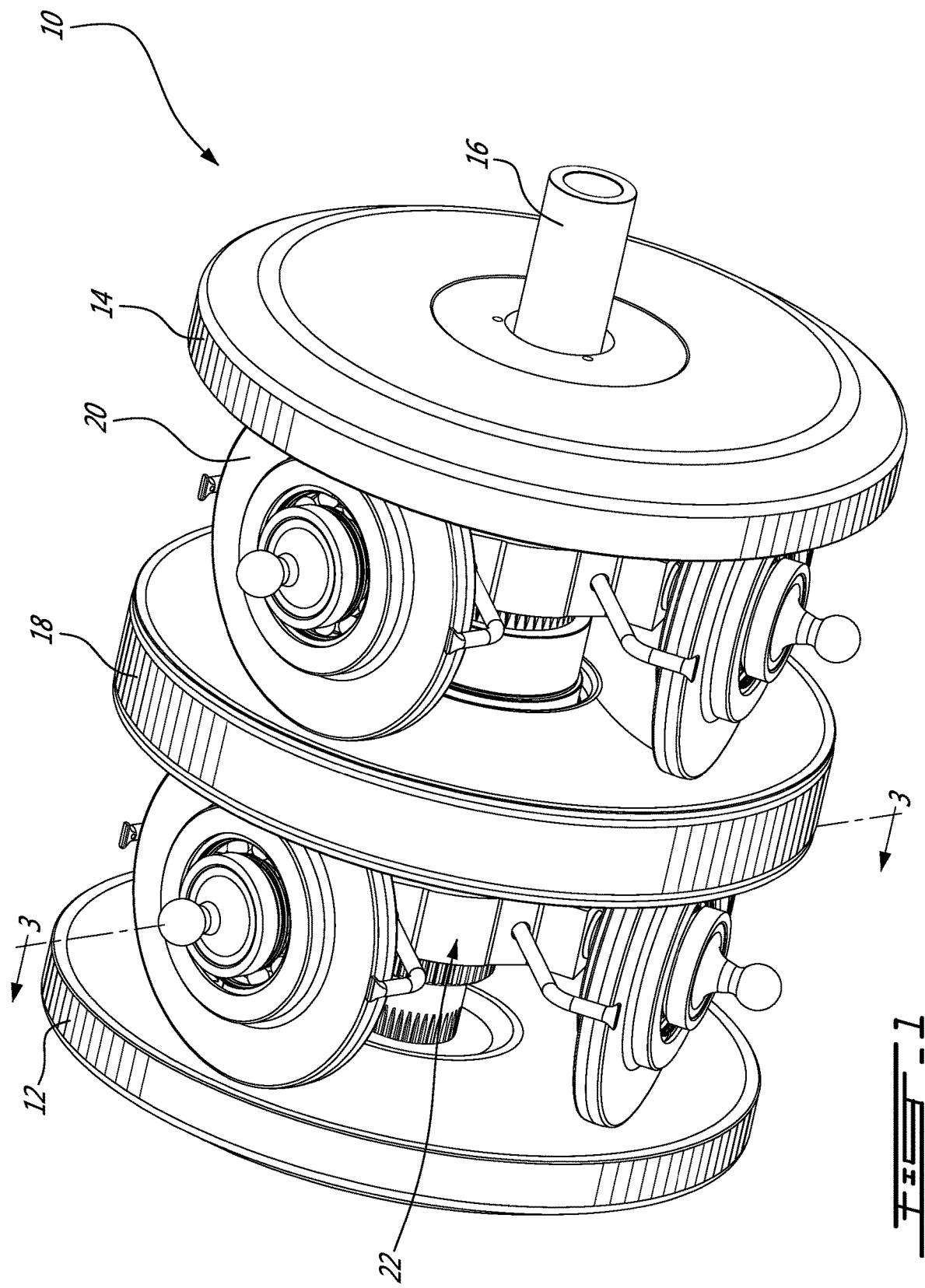

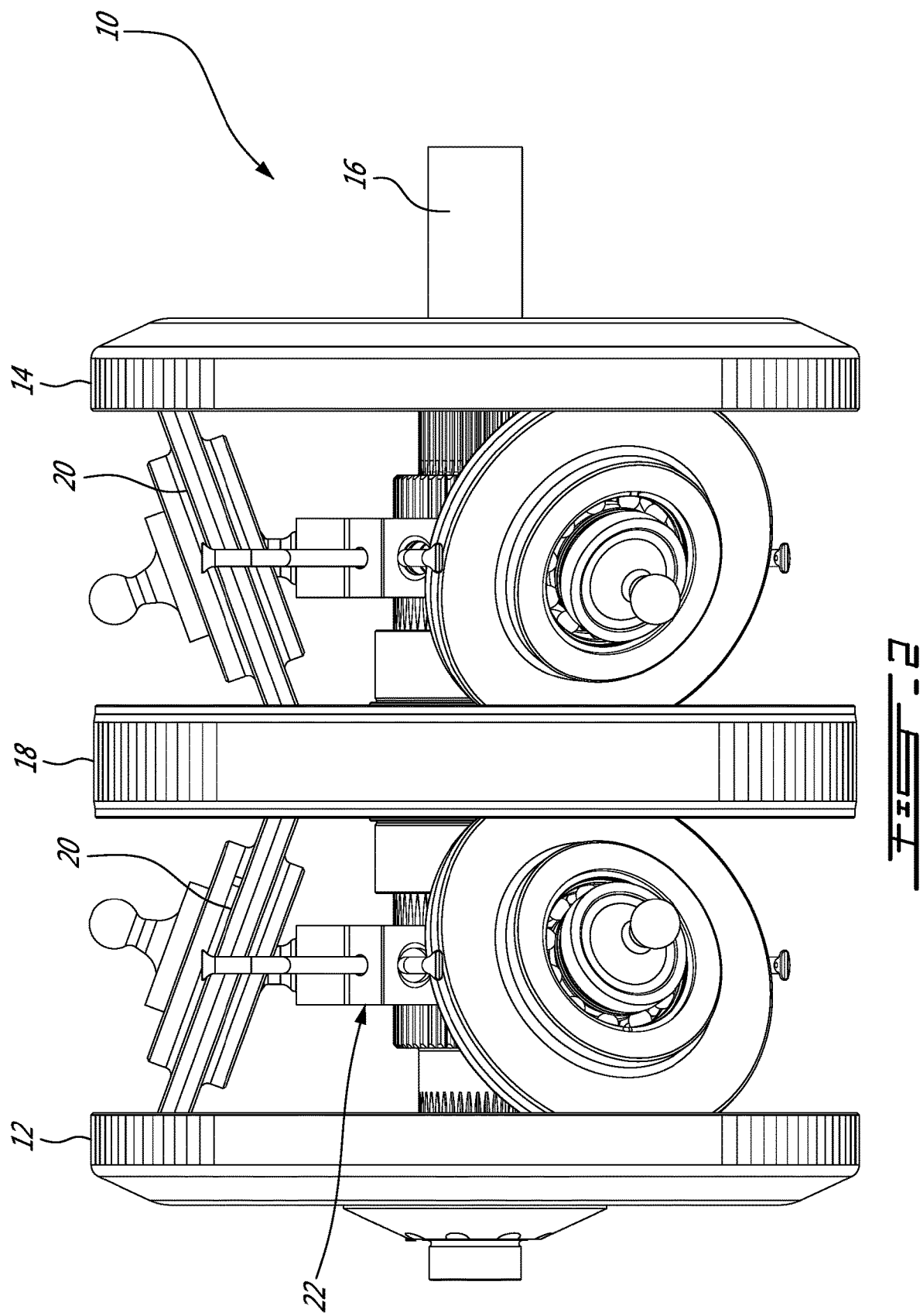

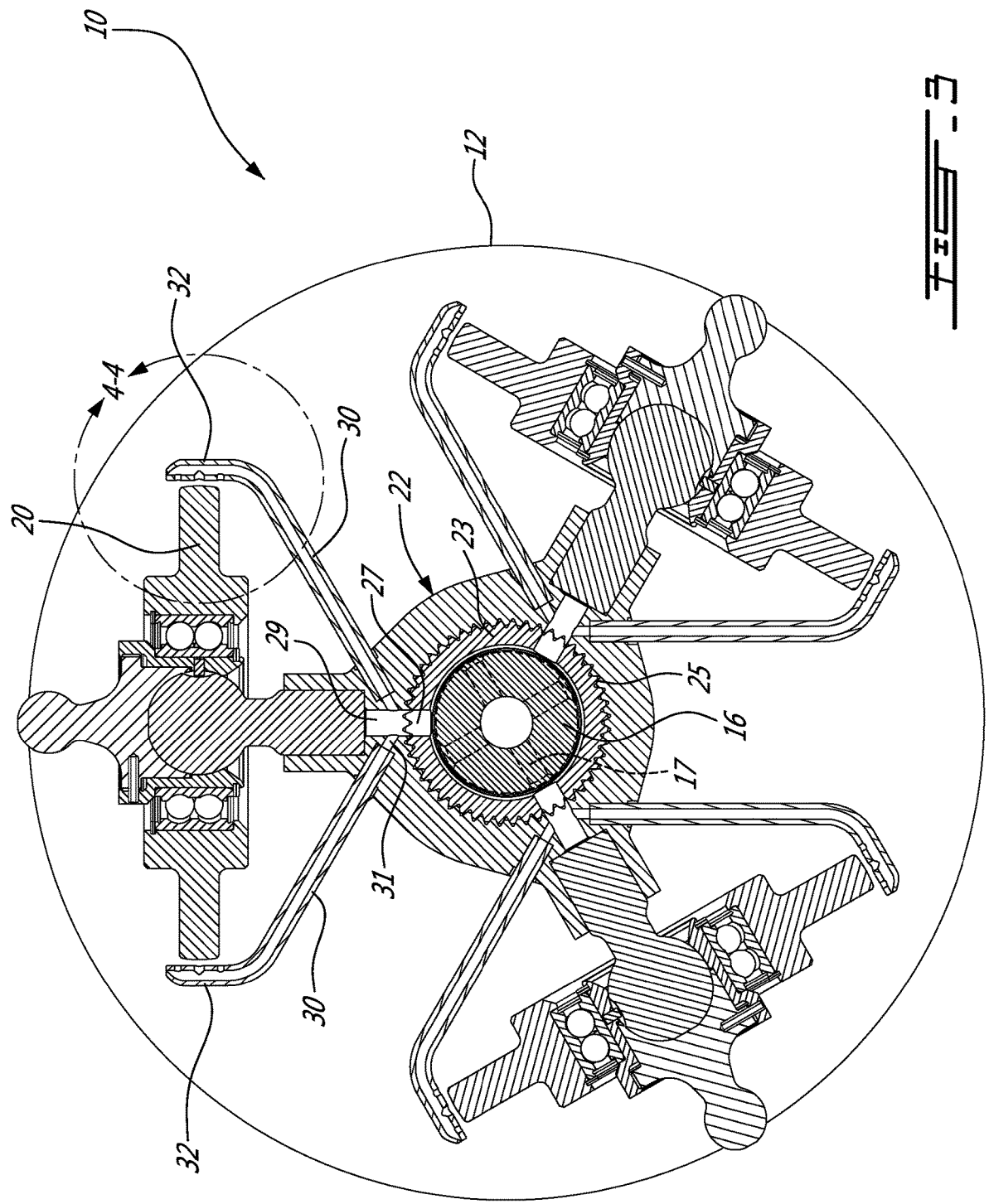

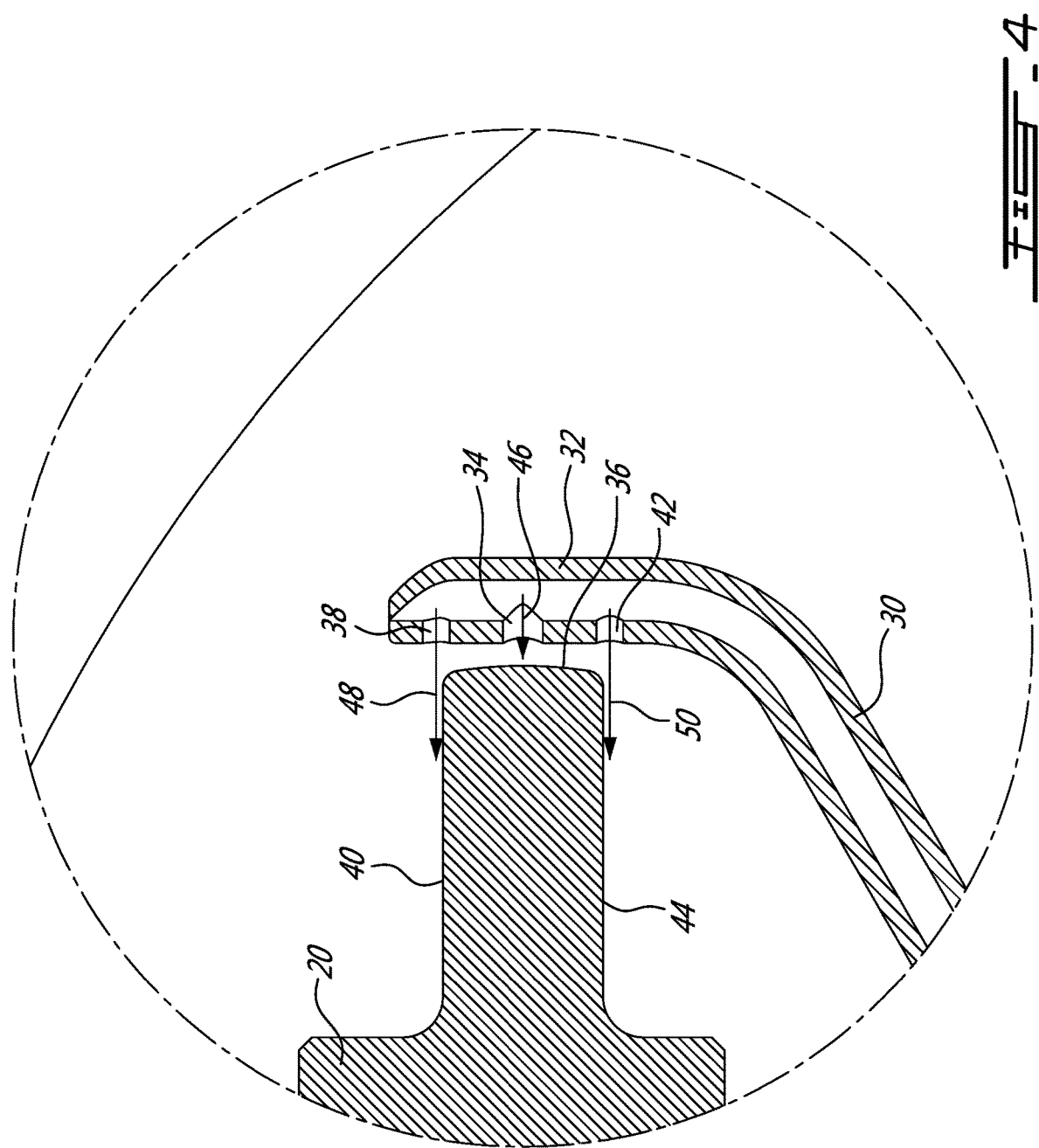

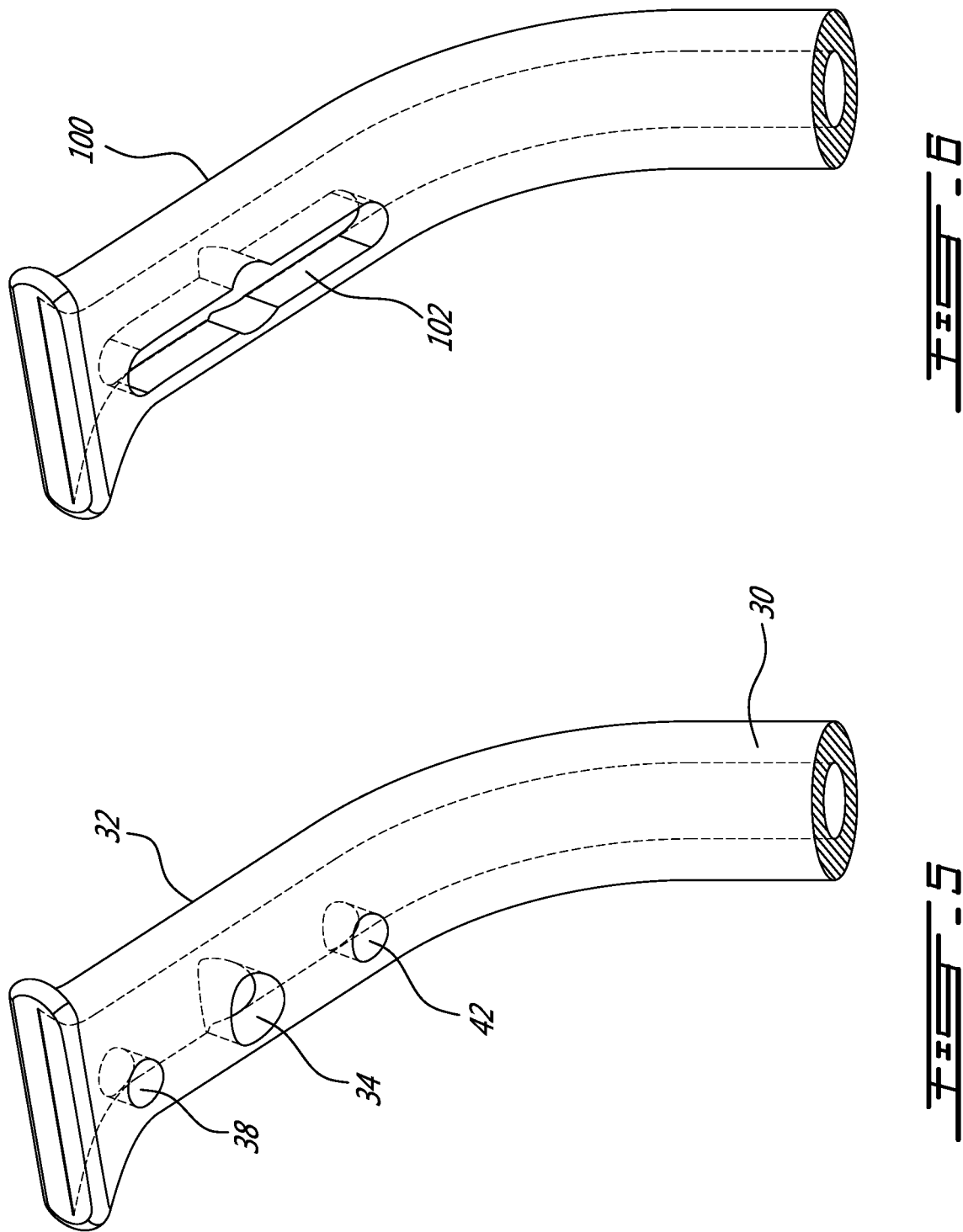

ROLLER COOLING ARRANGEMENT FOR TOROIDAL CVT

CROSS REFERENCE TO RELATED APPLICATIONS

This application is a national phase under 35 U.S.C. § 371 of International Patent Application No. PCT/CA2016/051441 filed on Dec. 8, 2016, which claims priority to and benefit of U.S. Provisional Patent Application No. 62/265,501 filed on Dec. 10, 2015, and the entirety of these applications are incorporated by reference herein.

FIELD

The present disclosure generally relates to toroidal Continuously Variable Transmissions (CVTs). More specifically, the present disclosure is concerned with an arrangement for the cooling of the rollers of such a CVT.

BACKGROUND

CVTs are well known transmission mechanisms that can change trough an infinite number of gear ratios between upper and lower limits. Toroidal CVTs, which are also well known, include a disks and roller arrangement where rollers are mounted between an input disk and an output disk to transmit power therebetween. Such CVT transmissions are generally used when transmission ratios have to be finely adjusted.

Since the rollers are forcefully maintained between the input and output disks while they are rotating, the friction present between the rollers and the disks generate heat in the rollers. To prevent premature degradation of the transmission, the rollers must be cooled.

BRIEF DESCRIPTION OF THE DRAWINGS

In the appended drawings:

FIG. 1 is a perspective view of a CVT provided with a roller cooling arrangement according to an illustrative embodiment;

FIG. 2 is a side elevation view of the CVT of FIG. 1;

FIG. 3 is a sectional end view of the CVT of FIG. 1;

FIG. 4 is an enlargement taken along line 4-4- of FIG. 3;

FIG. 5 is an enlarged view of a cooling nozzle of the cooling arrangement of the CVT of FIG. 1; and FIG. 6 is an enlarged view of a cooling nozzle according to a second illustrative embodiment.

DETAILED DESCRIPTION

An object is generally to provide an improved Toroidal CVT. More specifically, an object is to provide a Toroidal CVT provided with a roller cooling arrangement.

According to an illustrative aspect, there is provided a cooling arrangement to cool the rollers of a toroidal CVT including, for each roller, a nozzle so configured and sized as to project cooling fluid onto the edge and onto the opposite surfaces of the roller.

According to another aspect, there is provided a toroidal CVT including a first disk fixedly mounted to a shaft, a second disk rotatably mounted to the shaft and rollers connecting the input disk to the output disk, the rollers having a peripheral edge and opposite surfaces; the toroidal CVT also including a roller cooling arrangement including, for each roller, a nozzle so configured and positioned as to project cooling fluid onto the edge and onto the opposite surfaces of the roller.

According to a third aspect, there is provided a method for cooling a roller of a toroidal CVT, the roller including a peripheral edge and opposite surfaces, the method including projecting cooling fluid onto the peripheral edge and onto the opposite surfaces of the roller.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that while the expression "Toroidal CVT", standing for Continuously Variable Transmission is used herein to describe the illustrated dual-cavity full toroidal CVT, this expression is to be construed herein and in the appended claims as any type of toroidal CVT such as, for example, half-toroidal CVT and single cavity toroidal CVT.

It is to be noted that the expression "overdrive" when used herein in the context of a CVT, is to be construed herein and in the appended claims as a condition where the CVT ratio is such that the CVT output speed is higher than the CVT input speed. The CVT ratio (of output speed to input speed) is therefore higher that one to one (1:1).

It is to be noted that the expression "underdrive" when used herein in the context of a CVT, is to be construed herein and in the appended claims as a condition where the CVT ratio is such that the CVT output speed is lower than the CVT input speed. The CVT ratio (of output speed to input speed) is therefore lower that one to one (1:1).

The expressions "connected" and "coupled" are interchangeable and should be construed herein and in the appended claims broadly so as to include any cooperative or passive association between mechanical parts or components. For example, such parts may be assembled together by direct coupling or connection, or indirectly coupled or connected using further parts. The coupling and connection can also be remote, using for example a magnetic field or else.

The expression "input", without reference to a specific component such as a shaft, should be construed herein and in the appended claims, as including any movable part of an object, an assembly, a system or a mechanism that is used to receive a mechanical work from same or from another assembly, system or mechanism. Similarly, the expression "output" should be construed as including a similar part that is used to transfer a mechanical work.

Other objects, advantages and features of the roller cooling arrangement for toroidal CVT will become more apparent upon reading of the following non-restrictive description of illustrative embodiments thereof, given by way of example only with reference to the accompanying drawings.

Generally stated, the illustrative embodiment of the roller cooling arrangement described herein includes a cooling nozzle so configured as to project a cooling fluid on the contact edge of the roller and onto both opposite surfaces of the roller to thereby increase the contact surface between the cooling fluid and the roller.

Turning now to FIG. 1 of the appended drawings, a CVT 10 including a cooling arrangement according to an illustrative embodiment will be described.

The toroidal CVT 10 includes two input disks 12 and 14 connected to an input shaft 16, itself directly or indirectly connected to a prime mover (not shown). An output disk 18, rotatably mounted to the shaft 16 and positioned between the input disks 12 and 14, is interconnected therewith via rollers 20. The rollers 20 are so mounted to a central hub 22 that their angle may vary to thereby change the ratio between the input disks 12 and the output disk 18. A control assembly (not shown) is used to bring the rollers into a desired angle.

The CVT 10 also includes a roller cooling arrangement including hollow tubes 30 so designed as to project cooling fluid onto the rollers 20 as will be described hereinbelow.

While FIG. 1 illustrates the CVT at a unity ratio position, i.e. that the speed of the input disks 12, 14 and the speed of the output disk 18 are essentially the same, FIG. 2 illustrates the CVT 10 in an overdrive position.

Turning now to FIG. 3, which is a sectional view taken along line 3-3 of FIG. 1, the roller cooling arrangement, according to an illustrative embodiment, will be described in greater detail.

The roller cooling arrangement includes, for each roller 20, a pair of hollow tubes 30 that are mounted to the central hub 22. The hub is so configured that each hollow tube 30 is in fluid connection with the hollow shaft 16 that supplies cooling fluid thereto. The hollow shaft 16 may therefore be viewed as a source of cooling fluid.

More specifically, the hub 22 is mounted to a non-rotating sleeve 23 via a splined interconnection 25. Accordingly, the hub 22 and the elements attached thereto are non-rotating with respect to the shaft 16.

The sleeve 23 includes radial apertures 27 that are aligned with radial apertures 29 of the hub 22 when these elements are interconnected.

The sleeve 23 includes a central aperture allowing the shaft 16 to rotate thereinto. Apertures 17 in the shaft 16 allow the cooling fluid to flow therefrom.

The hub 22 includes shouldered apertures 31 that are branched onto apertures 29 and that are so sized as to receive the hollow tubed 30 therein.

Accordingly, the cooling fluid may flow from the shaft 16 to the hollow tubes 30.

Each hollow tube ends in a nozzle 32 configured to project cooling fluid onto a roller 20.

FIG. 4 is an enlarged portion of FIG. 3 illustrating one nozzle 32. As can be seen from this figure, the nozzle 32 includes a central aperture 34 facing the edge 36 of the roller 20, an external aperture 38 aligned with the top surface 40 of the roller 20 and an internal aperture 42 aligned with the bottom surface 44 of the roller 20. The distal end of the nozzle 42 is closed.

Accordingly, the cooling fluid will not only be projected onto the edge 36 of the roller 20 (see arrow 46) but will also be projected onto the opposite surfaces, i.e. the top and bottom surfaces 40 and 44, of the roller 20 (see arrows 48 and 50). Therefore, the contact area between the projected cooling fluid and the roller 20 is increased and the cooling of the roller 20 is more efficient.

It is to be noted that the cooling tubes 30 are so designed and positioned that the nozzles 32 are always positioned so that the central aperture 34 always faces the edge 36 of the roller 20 while the external and internal apertures 38 and 42 are always aligned with the top and bottom surfaces 40, 44 of the roller 20 notwithstanding the angle of the rollers. This is illustrated in FIGS. 1 and 2 where the position of the rollers 20 is different while the nozzles 32 are correctly aligned.

FIG. 5 of the appended drawings illustrates, in a perspective view, a nozzle 32.

One skilled in the art will understand that the hollow shaft 16 therefore acts as a manifold to distribute the cooling fluid from an external source (not shown) to the cooling nozzles 32, via the hub 22 and the hollow tubes 30 under a pressure applied by a pump (not shown) external or internal to the CVT 10. The cooling fluid can therefore be cooled externally from the working cavities of the CVT 10 using a conventional cooling mechanism (also not shown).

It is to be noted that the cooling fluid source, the pump and the cooling mechanism could be integrated to the casing (not shown) of the CVT 10 to yield a self-contained system.

Turning now to FIG. 6 of the appended drawings a nozzle 100 according to a second illustrative embodiment will be described. The main difference between the nozzles 32 and 100 concerns the cooling fluid outlet apertures. Indeed, while the nozzle 32 includes three outlet apertures, the nozzle 100 includes an elongated aperture 102 that is so configured and sized as to project cooling fluid onto the edge and the top and bottom surfaces of the roller 20.

One skilled in the art will understand that, for concision and clarity purposes, the CVT 10 is schematically illustrated in the appended drawings and that other elements (not shown) are required for the adequate operation of the CVT.

While the CVT 10 has been described as having two input disks 12, 14 and one output disk 18, this could be reversed.

It will also be understood by one skilled in the art that the cooling fluid could reach the nozzles by other means than the hollow shaft 16. Indeed, since the hub 22 is non-rotating with respect to the shaft 16, a supply tube (not shown) could be mounted thereto and placed in fluid communication with the aperture 29 of the hub 22, for example.

While the hollow tube 30 and the nozzles 32 and 100 are shown herein as being integrally formed, these elements could be independent and assembled.

It is to be understood that the roller cooling arrangement for toroidal CVT is not limited in its application to the details of construction and parts illustrated in the accompanying drawings and described hereinabove. The roller cooling arrangement for toroidal CVT is capable of other embodiments and of being practiced in various ways. It is also to be understood that the phraseology or terminology used herein is for the purpose of description and not limitation. Hence, although the roller cooling arrangement for toroidal CVT has been described hereinabove by way of illustrative embodiments thereof, it can be modified, without departing from the spirit, scope and nature thereof.

The following numbered clauses are offered as supplemental description.

1. A cooling arrangement to cool the rollers of a toroidal CVT including, for each roller, a nozzle so configured and sized as to project cooling fluid onto the edge and onto the opposite surfaces of the roller.

2. The cooling arrangement as recited in clause 1, wherein the nozzle includes a central aperture, an external aperture and an internal aperture.

3. The cooling arrangement as recited in clause 1, wherein the nozzle includes an elongated aperture.

4. The cooling arrangement as recited in any of the previous clauses including two nozzles for each roller.

5. A toroidal CVT including a first disk fixedly mounted to a shaft, a second disk rotatably mounted to the shaft and rollers connecting the input disk to the output disk, the rollers having a peripheral edge and opposite surfaces; the toroidal CVT also including a roller cooling arrangement including, for each roller, a nozzle so configured and positioned as to project cooling fluid onto the edge and onto the opposite surfaces of the roller.

6. The toroidal CVT as recited in clause 5, wherein the nozzle includes a central aperture, an external aperture and an internal aperture.

7. The toroidal CVT as recited in clause 5, wherein the nozzle includes an elongated aperture.

8. The toroidal CVT as recited in any of clauses 5 to 7, wherein the roller cooling arrangement includes two nozzles for each roller.

9. The toroidal CVT as recited in any of clauses 5 to 8, further comprising a hub rotatably mounted to the shaft and so configured as to receive cooling fluid, the roller cooling arrangement including a hollow tube fluidly interconnecting the hub and the nozzle.

10. The toroidal CVT as recited in clause 9, wherein the shaft is a hollow shaft and wherein the hub receives the cooling fluid via a connection with the shaft.

11. The toroidal CVT as recited in any of clauses 5 to 10, wherein the first disk is an input disk.

12. The toroidal CVT as recited in any of clauses 5 to 11, wherein the first disk includes two first disks 13. A method for cooling a roller of a toroidal CVT, the roller including a peripheral edge and opposite surfaces, the method including projecting cooling fluid onto the peripheral edge and onto the opposite surfaces of the roller.

14. The roller cooling method as recited in clause 13 further comprising:
providing a source of cooling fluid;
providing a nozzle so configured and positioned as to face a peripheral edge of the roller; and
hydraulically interconnecting the cooling fluid source and the nozzle.

What is claimed is:

1. A cooling arrangement to cool the rollers of a toroidal CVT including, for each roller, a nozzle so configured and sized as to project cooling fluid onto the edge and onto the opposite surfaces of the roller.

2. The cooling arrangement as recited in claim 1, wherein the nozzle includes a central aperture, an external aperture and an internal aperture.

3. The cooling arrangement as recited in claim 1, wherein the nozzle includes an elongated aperture.

4. The cooling arrangement as recited in claim 1 including two nozzles for each roller.

5. A toroidal CVT including a first disk fixedly mounted to a shaft, a second disk rotatably mounted to the shaft and rollers connecting the input disk to the output disk, the rollers having a peripheral edge and opposite surfaces; the toroidal CVT also including a roller cooling arrangement including, for each roller, a nozzle so configured and positioned as to project cooling fluid onto the edge and onto the opposite surfaces of the roller.

6. The toroidal CVT as recited in claim 5, wherein the nozzle includes a central aperture, an external aperture and an internal aperture.

7. The toroidal CVT as recited in claim 5, wherein the nozzle includes an elongated aperture.

8. The toroidal CVT as recited in claim 5, wherein the roller cooling arrangement includes two nozzles for each roller.

9. The toroidal CVT as recited in claim 5, further comprising a hub rotatably mounted to the shaft and so configured as to receive cooling fluid, the roller cooling arrangement including a hollow tube fluidly interconnecting the hub and the nozzle.

10. The toroidal CVT as recited in claim 9, wherein the shaft is a hollow shaft and wherein the hub receives the cooling fluid via a connection with the shaft.

11. The toroidal CVT as recited in claim 5, wherein the first disk is an input disk.

12. The toroidal CVT as recited in claim 11, wherein the first disk includes two first disks.

13. A method for cooling a roller of a toroidal CVT, the roller including a peripheral edge and opposite surfaces, the method including projecting cooling fluid onto the peripheral edge and onto the opposite surfaces of the roller.

14. The roller cooling method as recited in claim 13 further comprising:
providing a source of cooling fluid;
providing a nozzle so configured and positioned as to face a peripheral edge of the roller; and
hydraulically interconnecting the cooling fluid source and the nozzle.

* * * * *